United States Patent
Swiercz (10) Patent No.: US 10,286,565 B1
(45) Date of Patent: May 14, 2019

(54) SKIN REPLACEMENT FOR ROBOTIC MANIPULATOR

(71) Applicant: Amazon Technologies, Inc., Seattle, WA (US)

(72) Inventor: Waldemar Bogdan Swiercz, Malden, MA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 15/181,207

(22) Filed: Jun. 13, 2016

(51) Int. Cl.
| B25J 15/00 | (2006.01) |
| B25J 19/02 | (2006.01) |
| B25J 19/00 | (2006.01) |
| B25J 15/08 | (2006.01) |

(52) U.S. Cl.
CPC ........... B25J 19/0066 (2013.01); B25J 15/08 (2013.01)

(58) Field of Classification Search
None
See application file for complete search history.

(56) References Cited

U.S. PATENT DOCUMENTS

| 3,343,864 | A | | 9/1967 | Baer et al. |
| 3,675,962 | A | | 7/1972 | Simpson |
| 4,350,381 | A | | 9/1982 | Hellmann |
| 4,601,637 | A | * | 7/1986 | Aviles ................. B25J 15/0475 269/281 |
| 4,607,998 | A | | 8/1986 | Hawkes |
| 4,928,926 | A | | 5/1990 | Bloemendal et al. |
| 5,090,757 | A | | 2/1992 | Huber et al. |
| 5,245,885 | A | | 9/1993 | Robertson et al. |
| 5,431,086 | A | | 7/1995 | Morita et al. |
| 6,484,601 | B1 | | 11/2002 | Arrichiello |
| 8,182,010 | B2 | | 5/2012 | Lee et al. |
| 8,449,711 | B2 | | 5/2013 | Sanchez et al. |
| 2003/0111855 | A1 | * | 6/2003 | Muramatsu ............... B25B 9/00 294/65.5 |
| 2004/0051326 | A1 | | 3/2004 | Belik |
| 2007/0241577 | A1 | | 10/2007 | Waldorf et al. |
| 2013/0047596 | A1 | | 2/2013 | Zoppi et al. |
| 2016/0073584 | A1 | * | 3/2016 | Davidson ............... A01D 46/30 56/328.1 |
| 2016/0136820 | A1 | | 5/2016 | Lessing et al. |

OTHER PUBLICATIONS

U.S. Apppl. No. 15/181,244, filed Jun. 13, 2016, Titled: Robotic Gripper With Digits Controlled by Shared Fluid Volume.

* cited by examiner

*Primary Examiner* — Adam R Mott
(74) *Attorney, Agent, or Firm* — Kilpatrick Townsend & Stockton LLP (57) ABSTRACT

A system may include a robotic manipulator with a replaceable cover material applied to rigid portions of extension of the manipulator. The system can further include a sensor or other monitoring mechanism that permits a determination of a quality of the cover material to determine whether replacement is warranted, a cover removal mechanism that permits removal of the cover material, and/or a cover application mechanism that permits a replacement for the cover material to be applied to the rigid portion.

21 Claims, 8 Drawing Sheets

SKIN REPLACEMENT FOR ROBOTIC MANIPULATOR

BACKGROUND

Robotic grasping of items can be useful in many situations. However, certain challenges exist for effectively utilizing robotic grasping.

In various inventory systems—such as those in mail order warehouses, supply chain distribution centers, and custom-order manufacturing facilities—a large variety of items may be encountered by a robotic manipulator. The robotic manipulator in many cases may not be suitable for grasping all of the different shapes, sizes, and orientations of items presented in the inventory system. For example, delicate items may be difficult to handle without causing damage when grasped by a robotic manipulator with extensions constructed of a rigid and durable material. Yet, at the same time, robotic manipulator extensions constructed of a softer or more flexible material suitable to handle delicate objects may be less durable and may last considerably less time than rigid alternatives. Other issues may arise if provision is made for multiple types of manipulators that may be alternatively selected to handle any presented item in an inventory system. For example, additional costs may be incurred to provide manipulators with extensions of soft material for delicate items as well as manipulators with extensions of rigid material for all other items. Additionally, it may add undesirable complexity, costs, and/or time to suitably account for the processes of selecting and/or transitioning between such options.

Moreover, control systems for robotic manipulators can be very complex. For example, many manipulators utilize respective controllers for controlling respective extensions in synchronization with one another to perform grasping operations. Generally, complexity may lead to delays, for example, due to time consumed in a process of evaluating a large number of possible solutions to grasp the item and choosing from among those options. Complexity may also provide a greater number of modes in which a robotic manipulator can fail, which is desirably avoided.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to robotic grasping systems that may utilize robotic arms or manipulators and associated components to grasp items, such as in an inventory system. Specifically, certain features herein are directed to actuating systems and/or cover replacement systems for such robotic manipulators.

In various embodiments herein, actuating systems use changes in fluid pressure to cause actuation of extensions (alternatively referred to as "actuating extensions", "digits", "actuating subsystems", or the like) of robotic manipulators. An actuator may respond to a change in fluid pressure by causing movement of an associated extension. Multiple actuators may be connected through a shared fluid volume so that multiple extensions are affected by a single change in pressure in the shared volume. Thus, in an illustrative example, a piston is moved in a chamber to create a change in pressure experienced by multiple actuators that are fluidly coupled with the chamber. That change in pressure may cause multiple actuating extensions of the robotic manipulator to open or close around an item. In closing around an item, some actuating extensions may contact the item before others. The pressure change initially may be expended in causing the other extensions to continue to close while the extensions contacting the item are blocked from continuing to move. When contact blocks all of the actuating extensions associated with the shared volume from further movement, the pressure change may be expended in uniformly increasing the pressure applied by the actuating extensions in contact with the item. In some embodiments, another portion (e.g., an opposite end) of the chamber is fluidly coupled with actuators that perform a contrary function, for example, such that movement of the piston in one direction will simultaneously increase forces acting to urge extensions to open and decrease forces acting to urge the extensions to close.

In various embodiments herein, cover replacement systems may facilitate the use of a replaceable cover on actuating extensions of the robotic manipulator. The actuating extensions may be formed of a rigid material, and the cover be formed of a less rigid material than the remainder of the actuating extensions. The replaceable cover may improve an ability of actuating extensions to handle delicate objects, and the cover may be economically readily replaced when worn out. A sensor may be used to detect the quality of the cover and prompt removal of the worn cover and application of replacement cover. In some embodiments, the detection, removal, and/or application may be automated.

Figure 1:
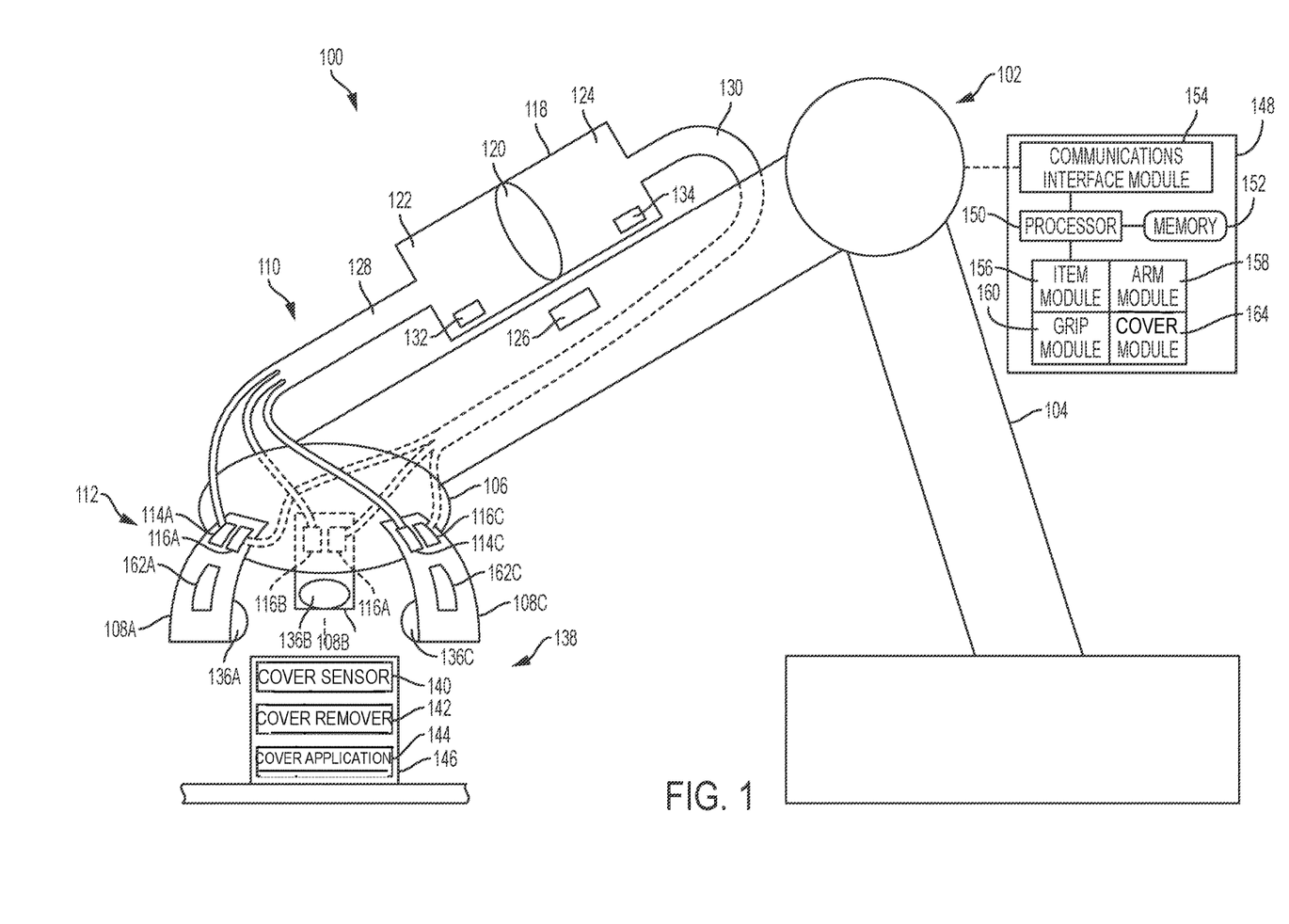
FIG. 1 illustrates a robotic grasping system according to certain embodiments.

Referring now to the drawings, FIG. 1 illustrates a robotic grasping system 100. The robotic grasping system 100 includes a robotic manipulator 102, a grip actuating system 110, a cover system 138, and a computer system 148.

The robotic manipulator 102 includes an arm 104, a hub 106, and articulating extensions 108 (individually identified as 108A-108C in FIG. 1). Although the description herein primarily refers to a robotic arm, any other mechatronic or robotic device may be used in lieu of or in addition to an arm. The hub 106 can include any suitable structure for supporting the extensions 108. The extensions 108 are movable relative to the hub 106, such as by being pivotally attached to the hub 106. The articulating extensions 108 can include any number of rigid sections including one, two, three, or more than three. Suitable materials for forming the rigid structures include, but are not limited to, metal and plastic. The extensions 108 can be spaced from one another a suitable distance to permit grasping of various sizes of items. The extensions 108 may move between an open configuration and a closed configuration relative to the hub 106. In many cases, the extensions 108 may encounter an item before reaching the closed configuration.

The extensions 108 can be controlled by the grip actuating system 110. The grip actuating system 110 shown includes actuators 112, a chamber 118, a piston 120, a piston actuator 126, an opening conduit 128, a closing conduit 130, an opening pressure sensor 132, and a closing pressure sensor 134.

Actuators 112 can correspond to any suitable form of fluid pressure actuator. Actuators 112 can cause movement of the extensions 108 or elements thereof in response to changes in fluid pressure communicated to the actuators 112. Suitable examples of actuators 112 include but are not limited to hydraulic cylinders with extendable rods, inflatable or otherwise variable size bladders, and structures with pistons movable in response to pressure acting thereon. The actuators 112 in FIG. 1 include opening actuators 114 (individually identified as 114A-114C in FIG. 1) and closing actuators 116 (individually identified as 116A-116C in FIG. 1). The opening actuators 114 in FIG. 1 are arranged to urge the extensions 108 to move toward the open configuration in response to the opening actuators 114 receiving increased fluid pressure, while the closing actuators 116 in FIG. 1 are arranged to urge the extensions 108 to move toward the closed configuration in response to the closing actuators 116 receiving an increase in fluid pressure.

The chamber 118 includes a first end 122 and a second end 124. The second end 124 is opposite the first end 122. The piston 120 is located between the first end 122 and the second end 124. The piston actuator 126 can cause the piston 120 to move toward either the first end 122 or the second end 124 of the chamber 118. The piston actuator 126 may include any suitable structure for moving the piston 120 within the chamber 118. One non-limiting example of the piston actuator 126 is an electromagnetic coil operable to exert magnetic fields on the piston 120 from outside of the chamber 118 to cause movement of the piston 120.

The opening conduit 128 is fluidly coupled with the first end 122 of the chamber 118. The opening conduit 128 is also fluidly coupled with each of the opening actuators 114A-C. Thus, the opening conduit 128 provides a shared volume among the first end 122 of the chamber 118 and the opening actuators 114. Movement of the piston 120 toward the first end 122 of the chamber 118 can cause an increase in pressure in the opening conduit 128. The increase in pressure in the opening conduit 128 is communicated to and experienced by the opening actuators 114. In response to the increase in pressure in the opening conduit 128, the opening actuators 114 can urge the extensions 108 to move toward the open configuration, for example, in preparation of grasping an item or to release an item.

The closing conduit 130 is fluidly coupled with the second end 124 of the chamber 118. The closing conduit 130 is also fluidly coupled with each of the closing actuators 116A-C. Thus, the closing conduit 130 provides a shared volume among the second end 124 of the chamber 118 and the closing actuators 116. Movement of the piston 120 toward the second end 124 of the chamber 118 can cause an increase in pressure in the closing conduit 130. The increase in pressure in the closing conduit 130 is communicated to and experienced by the closing actuators 116. In response to the increase in pressure in the closing conduit 130, the closing actuators 116 can urge the extensions 108 to move toward the closed configuration, for example, in order to grasp an item.

The opening actuators 114 and the closing actuators 116 may be opposed to one another. For example, a closing actuator 116 may oppose an opening action that is urged by operation of an opening actuator 114 and vice versa. Movement of the piston 120 toward the first end 122 may decrease an amount of pressure available in the closing conduit 130 while increasing amount of pressure available in the opening conduit 128. In this way, movement of the piston toward the first end 122 may increase a biasing force supplied by the opening actuators 114 while decreasing a biasing force provided by the closing actuators 116. Conversely, movement of the piston 120 toward the second end 124 may decrease the amount of pressure available in the opening conduit 128 while increasing the amount of pressure available in the closing conduit 130. In this way, movement of the piston toward the second end 124 may increase a biasing force applied by the closing actuators 116 while decreasing a biasing force provided by the opening actuators 114.

The opening pressure sensor 132 may provide an indication of pressure in the first end 122 and/or in the opening conduit 128. The closing pressure sensor 134 can provide an indication of pressure in the second end 124 of the chamber and/or in the closing conduit 130. In various embodiments, the opening pressure sensor 132 and/or the closing pressure sensor 134 can provide information to determine a pressure at which the extensions 108 are gripping an item. In some embodiments, extension position sensors 162 can be provided to indicate a relative position or orientation of the extension 108 relative to the hub 106. For example the extension position sensors 162 may correspond to strain gauges that can provide an output indicative of an amount that the extension 108 is bent or tilted relative to the hub 106 or relative to another portion of the extension 108.

The extensions 108A-C are each shown with a respective amount of replaceable cover material 136A-C. The replaceable cover material 136 can correspond to material that is more flexible and/or less slippery than rigid material of the extensions 108. Suitable examples of material from which the replaceable cover material 136 can be formed include silicone or rubber, but any material that is flexible, compressible, and/or deformable, and/or includes a suitable gripping surface can be used.

The cover system 138 can be utilized to facilitate replacement of the replaceable cover material 136. The cover system 138 is shown with a cover sensor 140, a cover remover 142, and a cover applicator 144. Any or all of these elements may be located in a structure 146 distinct from the arm 104, such as is schematically illustrated in FIG. 1. The structure 146 may be sized so that the extensions 108 of the robotic manipulator 102 can grip the structure 146 similarly to a manner in which the extensions 108 would grip an item to be handled within an inventory system. Additionally or alternatively, any or all of the cover sensor 140, the cover remover 142, or the cover applicator 144 can be associated with elements of the robotic manipulator 102, such as integrated into the extensions 108 and/or the hub 106.

The cover sensor 140 can include suitable structure to determine a quality of the replaceable cover material 136. For example, the replaceable cover 136 may include a conductive material and the cover sensor 140 may include a probe for engaging the cover material 136 and determining a conductivity level of the cover material 136 relative to an earlier detected level, an expected level, and/or some other threshold level. As another example, the cover sensor 140 may include an optical sensor capable of detecting changes in an optical characteristic of the replaceable cover material 136, such as a change in thickness, a change in size or shape, a change in translucency or a change in color. In some embodiments, the cover sensor 140 includes a pressure sensor capable of observing pressure variations on the cover material 136, such as may be useful in determining a number or intensity of gripping operations performed with the cover material 136.

The cover remover 142 can include any suitable mechanism for removing the cover material 136 from an extension 108 of the robotic manipulator 102. As non-limiting examples, the cover remover 142 may include a heating element, a mechanical element, and/or a chemical element. A heating element may be used to heat the cover 136 or an adhesive bonding the cover material 136 to an extension 108 by a sufficient amount to cause a deterioration or pliability that will allow the cover material 136 to fall off, burn up, or otherwise be ready for or facilitate removal. A mechanical element may be used to mechanically engage the cover material 136 or an adhesive layer coupling the cover material 136 to an extension 108, for example, to loosen and/or remove part or all of the cover material 136 from the extension 108 through scraping, grinding, rubbing, chipping, sanding, or other mechanical processes. A chemical element may be used to treat the cover material 136 or an adhesive bonding the cover material 136 to an extension 108 with a suitable chemical agent for causing the cover material 136 to degrade, deteriorate, or otherwise change in a way that will allow the cover material 136 to fall off, burn up, or otherwise be ready for or facilitate removal. As non-limiting examples, the chemical element may apply such a chemical agent via dipping, spraying, painting, or other application methods.

The cover applicator 144 can include any suitable structure for facilitating application of the cover material 136 to an extension 108. For example, the cover applicator 144 may include suitable structure for facilitating application of pressure of an extension 108 against the new layer of cover material 136 or against a layer of adhesive on the new layer of cover material 136, facilitating dipping the extension 108 into a material that will form or adhere the new layer of cover material 136 upon curing, facilitating painting the new layer of cover material 136 or an associated adhesive onto the extension 108, or facilitating spraying the new layer of cover material 136 or an associated adhesive onto the extension 108.

The computer system 148 can be utilized to control other features or components of the robotic grasping system 100. The computer system 148 shown includes a communication interface module 154, a processor 150, a memory 152, and item module 156, an arm module 158, a grip module 160, and a cover module 164. The memory 152 can include any form of non-transitory storage media for instructions that can be executed by the processor 150 to provide functionality described herein.

The communications interface module 154 can send and receive information between the computer system 148 and other components of the robotic grasping system 100. For example, the communications interface module may include appropriate wires or wireless communication structures for sending or receiving information relative to the piston actuator 126, the opening pressure sensor 132, the closing pressure sensor 134, the extension position sensor 162, and/or elements of the cover system 138. The communications interface module 154 may additionally or alternatively provide communication relative to databases, user interfaces, or other components to facilitate operation of the robotic grasping system 100.

The item module 156 can provide information about an item to be grasped by the robotic manipulator 102. For example, the item module 156 may provide information about a size, shape, weight, fragility, or other characteristic of an item to be grasped. In some embodiments, the item module 156 may provide information about strategies for grasping an item using the robotic manipulator 102. In some embodiments, the item module 156 may provide information about a maximum pressure that may be applied to an item without causing damage to the item, and/or a minimum pressure that ought to be applied to an item to obtain a sufficient likelihood of successfully grasping the item.

The arm module 158 can provide instructions for controlling the arm 104. For example, the arm module 158 may provide appropriate signals to cause the arm to move in a suitable fashion to match a grasping strategy designated by the item module 156, e.g., so that the extensions 108 of the robotic manipulator 102 approach an item at an appropriate angle for grasping the item.

The grip module 160 can provide information for controlling the grip actuating system 110. For example, the grip module 160 may communicate with the piston actuator 126 to cause actuation of the extensions 108. In some embodiments, the grip module 160 may control the piston actuator 126 in response to information received via a communications interface module 154 from the opening pressure sensor 132, the closing pressure sensor 134, and/or the extension position sensor 162. In some aspects, the grip module 160 may determine a position of the extensions 108 relative to the hub 106 based on input from the extension position sensor 162. Additionally or alternatively, the grip module 160 in some embodiments may determine a position of the extensions 108 relative to the hub 106 based on an amount of time that the grip actuating system 110 has been moving the piston 120 or providing a particular pressure distribution. In some embodiments, the grip module 160 may determine that all extensions 108 have contacted an item based on pressure variations detected by one or both of the opening pressure sensor 132 or the closing pressure sensor 134.

The cover module 164 can control and/or interact with elements of the cover system 138. For example, the cover module 164 may communicate with the cover sensor 140, the cover remover 142, and/or the cover applicator 144. In various embodiments, the cover module 164 may make a determination that replacement of the cover material 136 is warranted. This determination may be based on information from the cover sensor 140. In some embodiments, the determination may additionally or alternatively be based on an elapsed amount of time that the cover material 136 has been in service and/or a number of operations for which the cover material 136 has been used. The cover module 164 may control the cover remover 142 and the cover applicator 144 to respectively cause an old, used, or worn portion of cover material 136 to be removed and replaced with a new portion of cover material 136.

Figure 2:
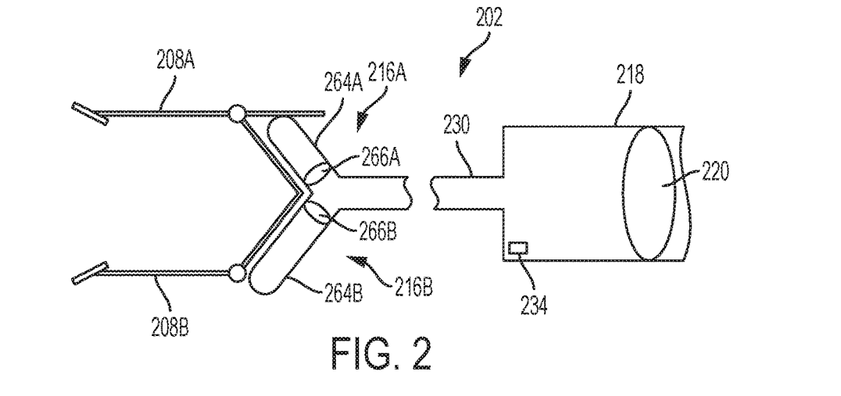
FIGS. 2-4 illustrate an actuation process of one example of a robotic manipulator that may be utilized in the robotic grasping system of FIG. 1 according to certain embodiments.
Figure 3:
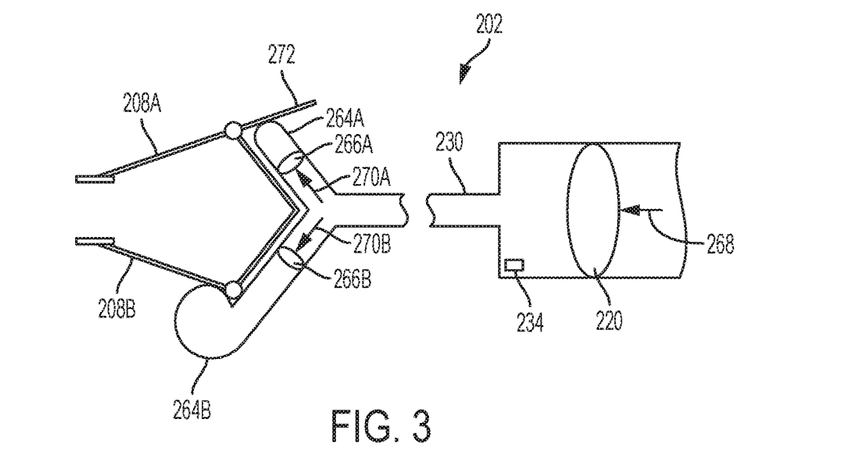
Figure 4:
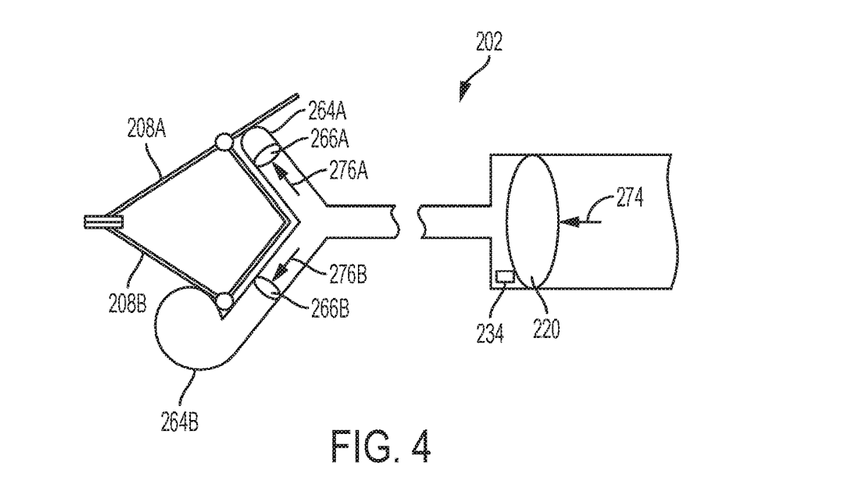
Figure 5:
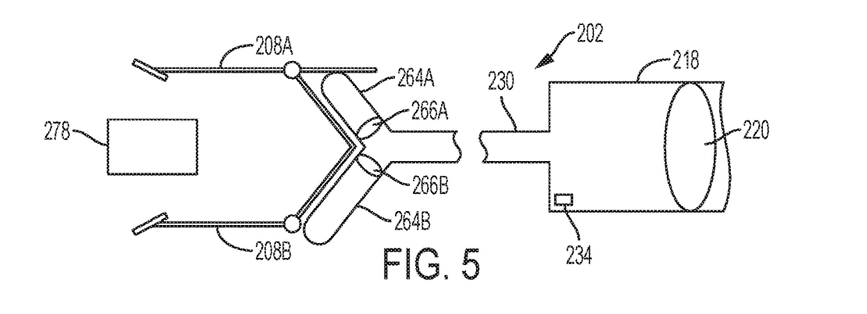
FIGS. 5-8 illustrate a grasping process of the robotic manipulator of FIGS. 2-4 according to certain embodiments.

FIGS. 2-4 illustrate one example of a robotic manipulator 202 that may be used in the robotic grasping system 100.

The robotic manipulator 202 is shown with extensions 208 (individually identified in FIG. 2 as 208A and 208B), closing actuators 216 (individually identified in FIG. 2 as 216A and 216B), a closing conduit 230, a closing pressure sensor 234, a chamber 218, and a piston 220. Each of these elements are examples of the elements of like name referenced with respect to FIG. 1.

The illustrated closing actuators 216 include extendable bladders 264 (individually identified as 264A and 264B) and sub pistons 266 (individually identified as 266A and 266B). The sub pistons 266 may move in response to fluid pressure exerted on them, such as through the closing conduit 230. Movement of the sub pistons 266 can cause a change in pressure in the bladders 264. The change in pressure in the bladders 264 can cause the bladders 264 to change in shape or size. The bladders 264 can include any suitable arrangement of ribs, thickened sections, different shapes, or other structure to cause the bladder 264 to expand or contract in a particular way in response to changes in fluid pressure. In some embodiments, the sub pistons 266 may be omitted and pressure may be communicated directly from the closing conduit 230 into the bladders 264 to cause a corresponding change in pressure that will result in a change in the size or shape of the bladder 264.

Referring to FIG. 3, movement of the piston 220 (e.g., as illustrated by arrow 268) can introduce additional pressure into the closing conduit 230. In some embodiments, the closing pressure sensor 234 may detect this change in pressure (or other changes in pressure) in or communicated to the closing conduit 230. The increased pressure in the conduit 230 can be expended in causing a corresponding movement of the sub pistons 266 (e.g., as illustrated by arrow 270A and 270B). The movement of the first sub piston 266A causes an increase in pressure in the first bladder 264A. The increase in pressure in the first bladder 264A causes the first bladder 264A to extend and push a lever portion 272 of the extension 208A. This force on the lever portion 272 causes the extension 208A to begin to close (e.g., to move from the position in FIG. 2 to the position in FIG. 3). Similarly, movement of the second sub piston 266B can cause an increase in pressure in the second bladder 264B that causes the second bladder 264B to expand. Expansion of the second bladder 264B engages the second extension 208B and causes the second extension 208B to begin to close (e.g., to move from a position in FIG. 2 to the position of FIG. 3).

Referring to FIG. 4, continued movement of the piston 220 (e.g., as illustrated by arrow 274) can cause additional pressure that is expended in further extending the bladders 264, e.g., by moving the sub pistons 266 (e.g., as illustrated by arrows 276A and 276B). Continued extension of the bladders 264 can cause the extensions 208 to continue to close (e.g., reaching the closed configuration of FIG. 4 from the configuration shown in FIG. 3).

Figure 6:
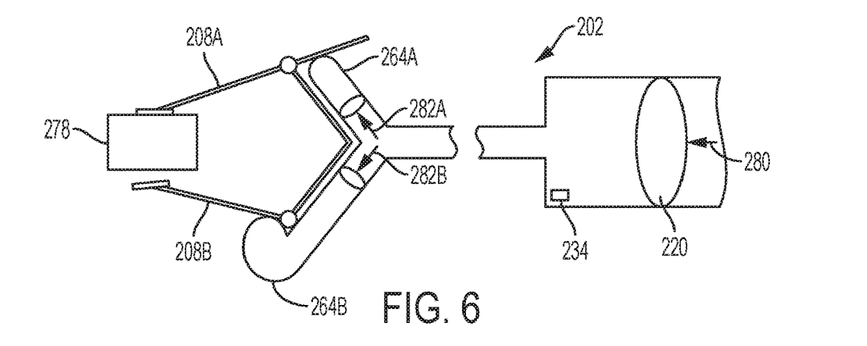
Figure 7:
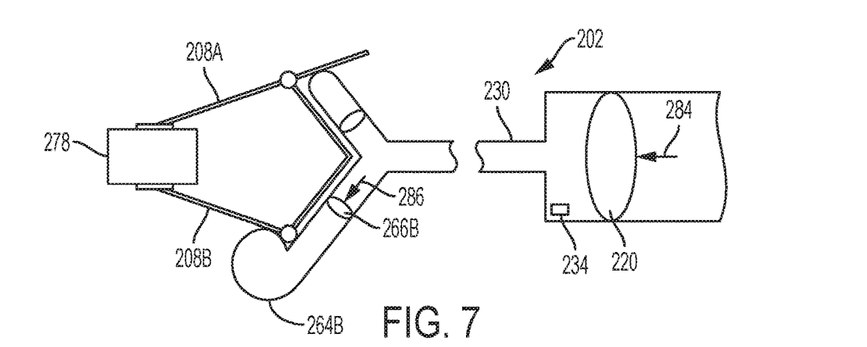

FIGS. 5-8 show an illustrative example of the robotic manipulator 202 grasping an item 278. As the piston 220 moves from the position in FIG. 5 toward the position in FIG. 6 (e.g., as illustrated by arrow 280 in FIG. 6), the bladders 264 can be extended (e.g., by movement of the pistons 266 illustrated by the arrows 282) to cause the extensions 208 to close toward the item 278. In FIG. 6, the first extension 208A is shown contacting the item 278, while the second extension 208B has not yet reached the item 278.

The contact of the first extension 208A with the item 278 may block additional closing movement of the first extension 208A. Accordingly, referring to FIG. 7, additional movement of the piston 220 (e.g., illustrated by arrow 284) may cause pressure in the closing conduit 230 that is expended in further expanding the second bladder 264B (e.g., as illustrated by the arrow 286 moving the second sub piston 266B). This further expansion of the second bladder 264B may occur without a corresponding expansion of the first bladder 264A (e.g., as a result of the first extension 208A being constrained by contact with the item 278 while the second extension 208B is not so constrained). Eventually, this further expansion of the second bladder 264B may bring the second extension 208B into contact with the item 278 (e.g., moving the second extension 208B from the position in FIG. 6 to the position FIG. 7).

Figure 8:
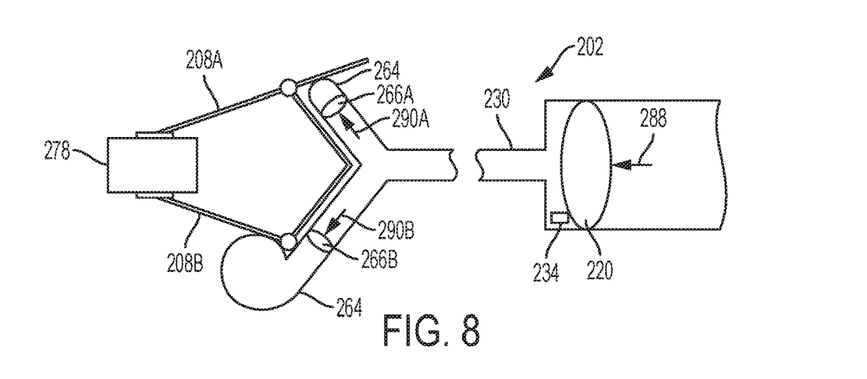

Referring to FIG. 8, when all of the extensions 208 are blocked from continuing to move, increasing pressure in the closing conduit 230 can increase a pressure with which the extensions 208 grip the item 278. For example, continued movement of the piston 220 (e.g., as illustrated by arrow 288) may increase pressure in the closing conduit 230. This increased pressure in the closing conduit 230 may in turn increase pressure in the bladders 264 (e.g., due to movement of the sub pistons 266, as illustrated by the arrows 290A and 290B). Yet, because the extensions 208 are blocked from closing further by contact with the item 278, the bladders 264 may be prevented from further expansion. Thus, the additional pressure in the bladders 264 instead may be expended in increasing a force with which the extensions 208 press against the item 278. Such an arrangement may allow all of the extensions 208 to press against the item 278 with a uniform amount of force that can be increased or limited as desired to a suitable amount for grasping the item 278 based on the slipperiness, fragility, or other characteristics of the item. This pressure or pressing force may correspond to the pressure measured with sensor 234.

Figure 9:
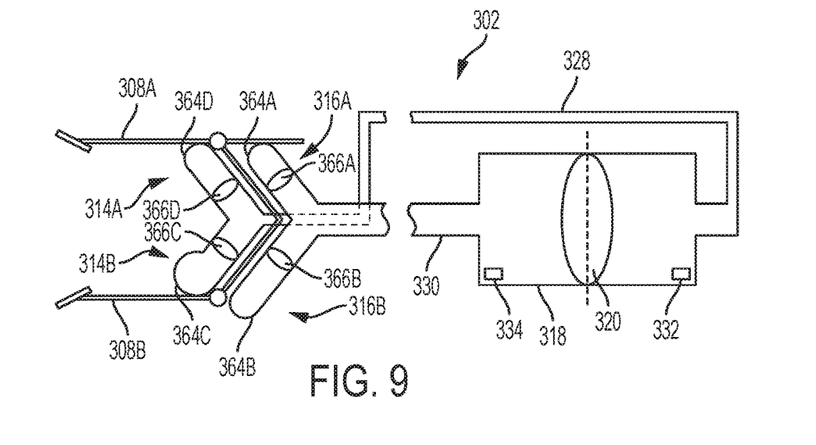
FIGS. 9-11 illustrate actuation of another example of a robotic manipulator that may be utilized in the robotic grasping system of FIG. 1 according to certain embodiments.
Figure 10:
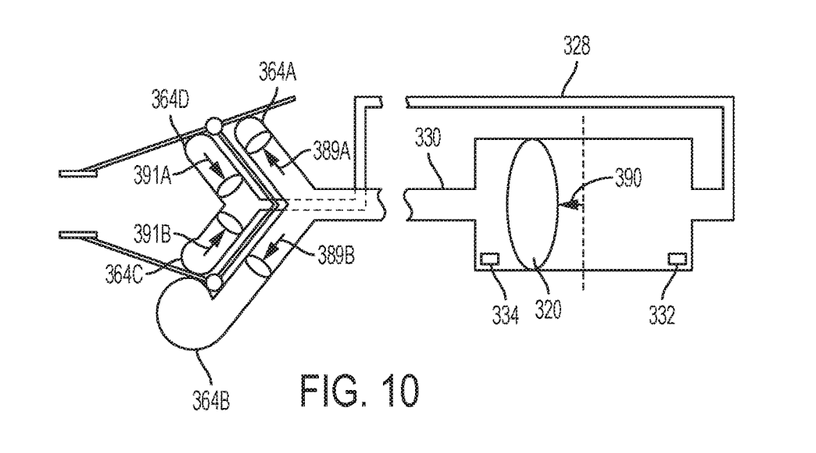
Figure 11:
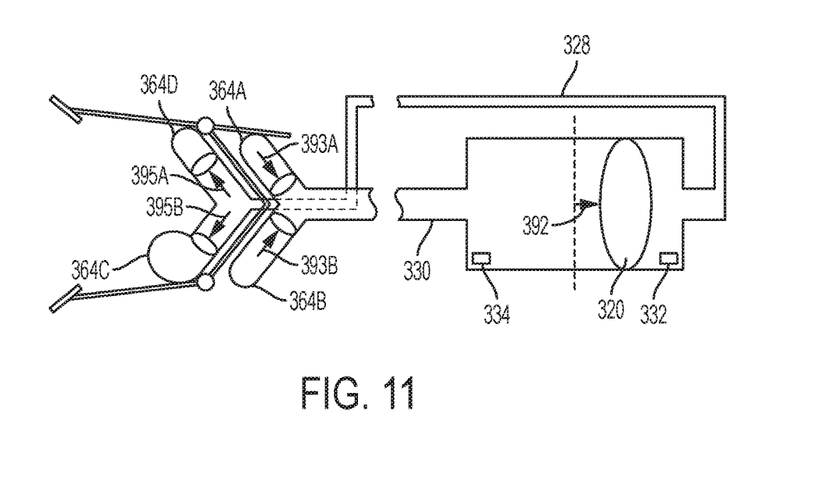

FIGS. 9-11 illustrate another robotic manipulator 302 that can be utilized in the grasping system 100 of FIG. 1. The robotic manipulator 302 is shown with articulating extensions 308 (individually identified in FIG. 9 as 308A and 308B), closing actuators 316 (individually identified in FIG. 9 as 316A and 316B), a closing conduit 330, opening actuators 314 (individually identified in FIG. 9 as 314A and 314B), an opening conduit 328, an opening pressure sensor 332, a closing pressure sensor 334, a chamber 318, and a piston 320. Each of these elements are examples of the elements of like name referenced with respect to FIG. 1. For example, the opening pressure sensor 332 and the closing pressure sensor 334 may detect changes in pressure that occur respectively in the opening conduit 328 and in the closing conduit 330. Further, similar to the robotic manipulator 202, the closing actuators 316 and opening actuators 314 are each shown including extendable bladders 364 (individually identified as 364A, 364B, 364C, and 364D) and sub pistons 366 (individually identified as 366A, 366B, 366C, and 366D). The closing conduit 330 is in fluid communication with the closing actuators 316 and the opening conduit 328 is in fluid communication with the opening actuators 314.

Movement of the piston 320 toward one end of the chamber 318 can increase a force urging the extensions 308 in one direction while decreasing a force urging the extensions 308 in an opposing direction. For example, referring to FIG. 10, movement of the piston 320 toward the closing conduit 330 (e.g., as illustrated by the arrow 390) may also be a movement away from the opening conduit 328. Such movement of the piston 320 can simultaneously increase pressure in the closing conduit 330 and decrease pressure in the opening conduit 328. As illustrated by the arrows 389 and 391, the increased pressure in the closing conduit 330 may cause expansion of the bladders 364A and 364B of the closing actuators 316 (and thus an increased force urging toward closing the extensions 308) while the decreased pressure in the opening conduit 328 causes retraction of the bladders 364C and 364D of the opening actuators 314 (and thus a decreased force urging toward opening the extensions 308).

In contrast, referring to FIG. 11, movement of the piston 320 away from the closing conduit 330 (e.g., as illustrated by the arrow 392) may also be a movement toward the opening conduit 328. Such movement of the piston 320 can simultaneously decrease pressure in the closing conduit 330 and increase pressure in the opening conduit 328. As illustrated by the arrows 393 and 395, the decreased pressure in the closing conduit 330 may cause retraction of the bladders 364A and 364B of the closing actuators 316 (and thus a decreased force urging toward closing the extensions 308) while the increased pressure in the opening conduit 328 causes expansion of the bladders 364C and 364D of the opening actuators 314 (and thus an increased force urging toward opening the extensions 308).

Other variations of the manipulator 302 are also possible. For example, although the manipulator 302 is illustrated with bladders 364 that primarily push extensions 308 in particular directions, the bladders 364 could alternatively be arranged to primarily pull extensions 308 in particular directions. In some embodiments, a given actuator may be capable of both pushing (e.g., in response to increased pressure) and pulling (e.g., in response to decreased pressure) in order to move extensions 308 in associated directions. In some embodiments, an extension 308 may be associated with an actuator that is capable of causing both closing and opening, rather than being associated with a separate closing actuator and a separate opening actuator. Additionally, although the manipulator 302 is illustrated with opening actuators 314 and closing actuators 316 that respond to an increase in pressure to bias the extensions 308 in respective directions, embodiments may additionally or alternatively include arrangements that respond to decreases in pressure to bias the extensions 308 in the same respective directions. Moreover, although the manipulator 302 is shown with bladders 364, other types of actuators may additionally or alternatively be used, including pressurized cylinders with extending rods or other types of actuators that are responsive to fluid pressure to cause actuation. In some embodiments, the chamber and the piston may be replaced and/or supplemented with an alternate pressure source, which may include, but is not limited to, any hydraulic, pneumatic, or other form of pump, compressor, or other component capable of providing suitable changes in pressure that can be controlled to correspondingly control actuation of the extensions 308.

Figure 12:
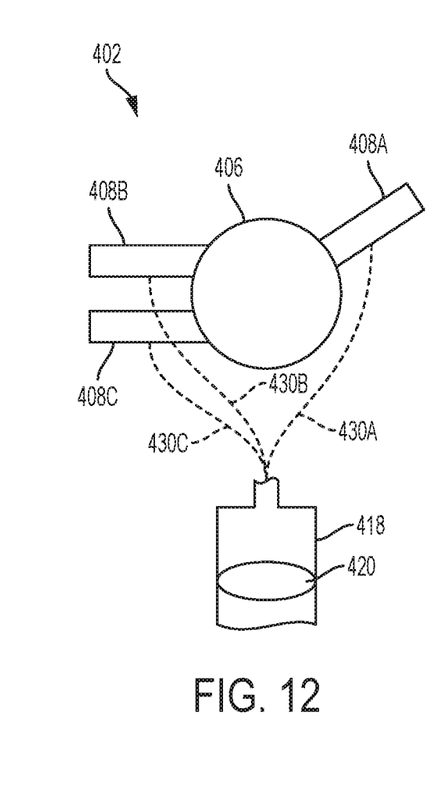
FIGS. 12-14 illustrate actuation of a further example of a robotic manipulator that may be utilized in the robotic grasping system of FIG. 1 according to certain embodiments.
Figure 13:
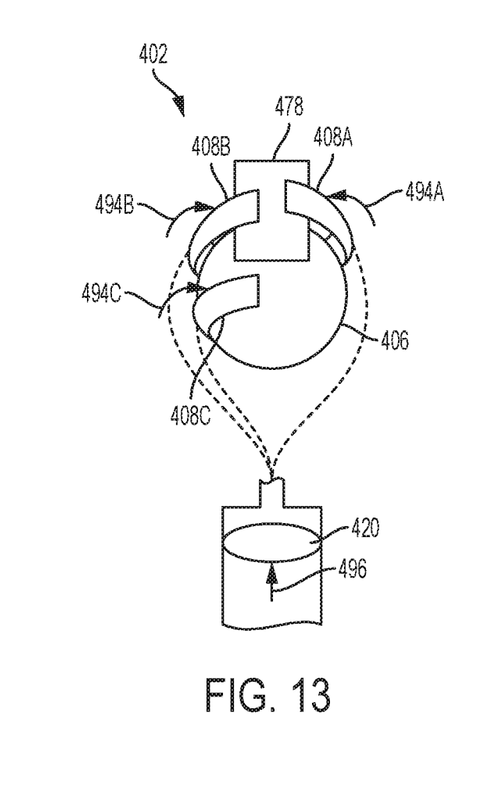
Figure 14:
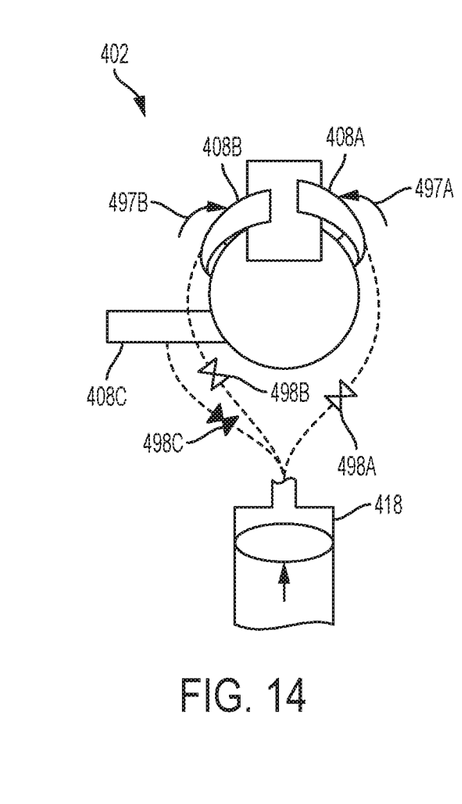

FIGS. 12-14 illustrate actuation of a further example of a robotic manipulator 402 that may be utilized in the robotic grasping system 100 of FIG. 1. The robotic manipulator 402 includes articulating extensions 408 (individually referenced as 408A-C) that are supported by a hub 406 and actuated through fluid communication (e.g., through branches of a closing conduit 430A-C) with a chamber 418 having a piston 420. In some embodiments, fewer than all extensions 408 may contact an item 478 in a grasping operation. For example, referring to FIG. 13, as the extensions 408 close about an item 478 (e.g., as illustrated by arrows 494), a first extension 408 and a second extension 408B may contact the item 478 while the third extension 408C continues to close toward the hub 406 without contacting the item 478. In various embodiments, pressure provided by movement of the piston 420 (e.g., illustrated by arrow 496) initially may be expended in causing movement of any remaining extensions 408 that have not been blocked from further movement by contact with an item 478, the hub 406, or other structure obstructing the movement of the extension 408. When all extensions 408 are blocked from moving, the pressure may cause a uniform increase in the amount of force with which all of the extensions 408 press against the respective surfaces that are blocking further movement of the extensions 408.

In some embodiments, valves 498 (individually identified as 498A-C) may be provided for selectively deactivating extensions 408 from actuating in response to communicated pressure from the chamber 418. For example, referring to FIG. 14, a valve 498C may be closed (e.g., under control of the grip module 160 of FIG. 1) to prevent pressure from the chamber 418 from reaching the third extension 408C. Valves 498B and 498A may be maintained in an open state to permit the first extension 408A and the second extension 408B to close about the item 478 (e.g., as illustrated by arrows 497A-B) in response to pressure communicated from the chamber 418. Such an arrangement may be useful for example in certain scenarios when an extension 408 is expected to interfere with a designated gripping operation.

Figure 15:
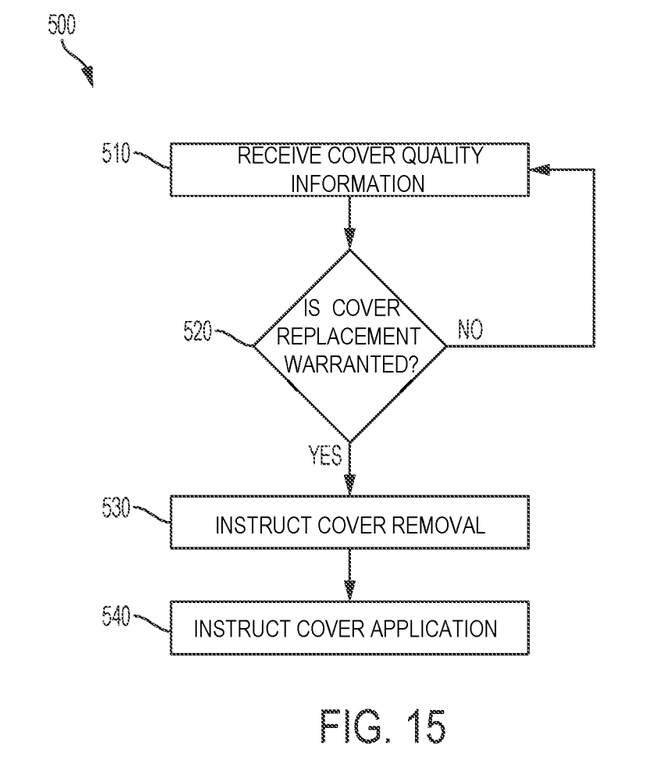
FIG. 15 is a flowchart illustrating a process that may be performed by a cover replacement system that may be utilized in the robotic grasping system of FIG. 1 according to certain embodiments.

FIG. 15 is a flowchart illustrating a process 500 that may be performed by a cover system 138 that may be utilized in the robotic grasping system 100 of FIG. 1. In some embodiments, some or all of the operations of the process 500 can be performed by the cover module 164.

At operation 510, cover material quality information can be received. For example, information can be received from the cover sensor 140 of FIG. 1. In some embodiments, information from the cover sensor 140 may include a conductivity level of the cover 136. Additionally or alternatively, the information may be about an optically detectable characteristic of the cover material 136 such as a thickness, size, shape, translucency or color. In some embodiments, the cover sensor 140 may be a pressure sensor (e.g., located on an extension 108) that can provide information about pressure applied to the cover material. Information about pressure applied to the cover material in some embodiments may be used to determine a number of times the cover material has been used for gripping operations, an intensity of gripping operations performed with the cover material, and/or a resilience or ability of the cover material 136 to return to an unstressed state.

At operation 520, a determination can be made about whether or not replacement of a cover material is warranted. The determination made in operation 520 may be made based on information obtained at operation 510. For example, the cover module 164 may receive information about a conductivity level of the cover material 136 obtained from the cover sensor 140 in operation 510 and compare the detected value to a threshold value to determine whether replacement is warranted. In another example, the cover module 164 may compare information about an optical characteristic obtained in operation 510 to a threshold value to determine whether replacement is warranted. In a further example, the cover module 164 may utilize pressure information obtained in operation 510 to determine a number and/or intensity of operations for which the cover material 136 has been used and determine if such usage exceeds a relevant threshold and warrants replacement.

The determination made in operation 520 may be based on other criteria of monitoring the cover material 136. For example, the grip module 160 or other elements of the computer system 148 may record a number and/or time duration of operations performed with a particular set of cover material 136, and the cover module 164 may compare such information to threshold values to make the determination of whether cover replacement of the cover material is warranted. In another example, the grip module 160 or other elements of the computer system may determine that a grasping operation involving the a layer of the cover material 136 was unsuccessful. This indication of non-success may be particularly relevant if the grasping operation is otherwise known to have adequately grasped the item in scenarios when cover material 136 has been freshly provided or has not yet deteriorated from use. Thus, the determination made in operation 520 may be based on an indication that a grasping operation involving the cover material 136 was unsuccessful.

If the determination at operation 520 indicates that replacement of the cover material is not warranted (e.g., no at 520) the cover module 164 may return to operation 510. For example, the cover module 164 may iteratively receive cover material quality information until a determination is made that replacement of the cover material is warranted. If the determination at operation 520 indicates that replacement of cover material is warranted (e.g., yes at 520), the process may continue at operation 530.

At operation 530, cover material removal may be instructed. For example, the cover module 164 may provide instructions that cause a cover remover 142 to remove the cover layer 136. In some embodiments, the cover remover 142 may activate and/or control a heating element, a chemical element, and/or a mechanical element to accomplish removal of the cover layer 136. In another example, the cover module 164 may provide instructions to a user interface (e.g., via the communication interface module 154) to instruct an operator to perform the removal of the cover layer 136. As non-limiting examples, the operator may be instructed to remove a sheath or glove corresponding to the cover layer 136, scrape off or otherwise mechanically work the cover layer 136 (e.g., using a mechanical element such as a blade, scraper, sander, grinder, chipper, or other tool), apply a chemical agent to the cover layer 136 (such as by dipping, spraying, painting, or performing other application methods so that the chemical agent can degrade, deteriorate, or otherwise change the cover layer 136 or a corresponding adhesive to cause or facilitate removal), and/or use a heating element (such as to burn off the cover layer or heat the cover layer or a corresponding adhesive to increase pliability and ease of removal).

At operation 540, application of a cover material may be instructed. For example, the cover module 164 may provide instructions that cause a cover applicator 144 to apply a new cover layer 136 to an extension 108. In some embodiments, the cover applicator 144 may activate appropriate automated elements to facilitate replacement of the cover material by application of pressure of an extension 108 against a new layer of cover material 136 or against a layer of adhesive on the new layer of cover material 136, dipping an extension 108 into a material that will form or adhere the new layer of cover material 136 upon curing, painting a new layer of cover material 136 or an associated adhesive onto an extension 108, or spraying the new layer of cover material 136 or an associated adhesive onto an extension 108. In another example, the cover module 164 may provide instructions to a user interface (e.g., via the communication interface module 154) to instruct an operator to perform the application of the new cover layer 136. As non-limiting examples, the operator may be instructed to install a sheath or glove corresponding to the cover layer 136 and/or to use other elements just listed as automated options.

FIGS. 16-21 illustrate an example cover replacement system 638 that may be utilized in the robotic grasping system of FIG. 1. The cover replacement system 638 is an example of the cover system 138, and elements of like name to elements described with respect to FIG. 1 are examples of those elements described with respect to FIG. 1. For example, the cover replacement system 638 interacts with an extension 608 and includes a sensor 640, a remover 642, an applicator 644, and a structure 646.

The cover replacement system 600 is illustrated with elements contained in a structure 646 (e.g., a casing). The structure 646 may be sized so that extensions 608 of the corresponding robotic grasping system may engage the structure 646 in response to operation of grip actuating system 110.

In FIGS. 16-21, the sensor 640 includes a probe 639, the remover 642 includes a blade 643 and a heating element 641, and the applicator 644 includes a belt 645 and drives 647. An example sequence of operation of these elements will now be described with reference to FIGS. 16-21.

Figure 16:
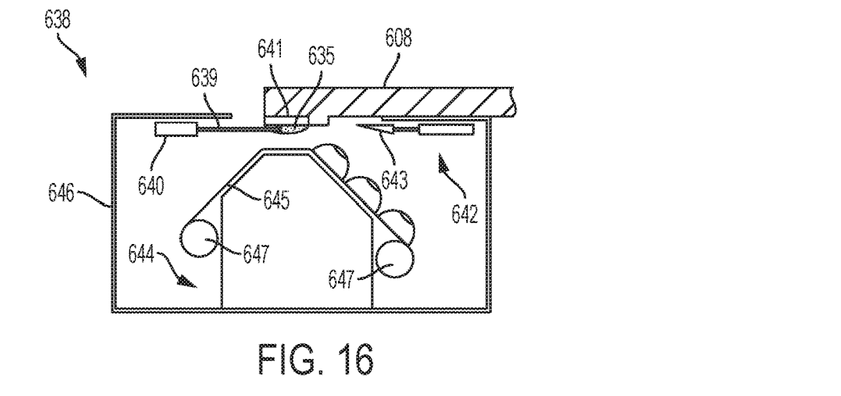
FIGS. 16-21 illustrate an example cover replacement system that may be utilized in the robotic grasping system of FIG. 1 according to certain embodiments.

Referring to FIG. 16, the extension 608 with old cover material 635 is brought into engagement with the structure 646. The probe 639 is brought into contact with the old cover material 635. The probe detects a quality of the old cover material 635, for example as discussed in operation 510 of process 500 and FIG. 15.

Figure 17:
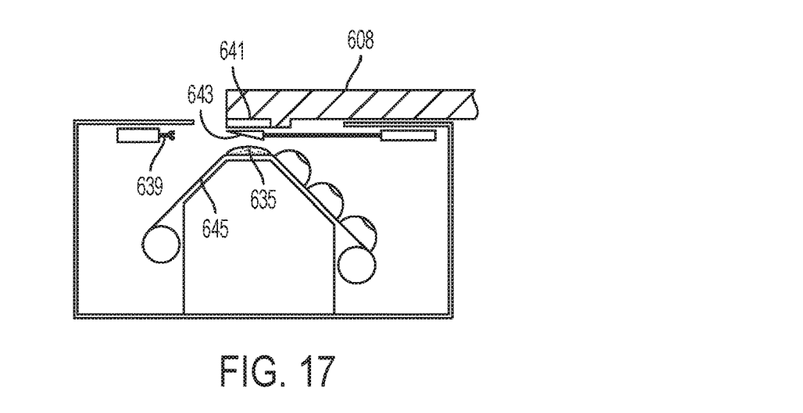

Referring to FIG. 17, the probe 639 is retracted upon completion of sensing the cover material quality. If replacement of the old cover material 635 is warranted, the cover remover 142 is activated, for example, as discussed in operations 520 and 530 of process 500 and FIG. 15. The heating element 641 activates and heats the old cover material 635 (and/or adhesive holding the old cover material 635 to the extension 608) a sufficient amount to cause melting or pliability that allows the old cover material 635 to fall off of the extension 608 (e.g., to land on the belt 645 to facilitate eventual conveyance away). Additionally or alternatively, the blade 643 is extended to scrape the old cover material 635 off of the extension 608. In embodiments using both the heating element 641 and the blade 643, the heating element 641 may cause the old cover material 635 or corresponding adhesive to be easier to scrape off by the blade 643.

Figure 18:
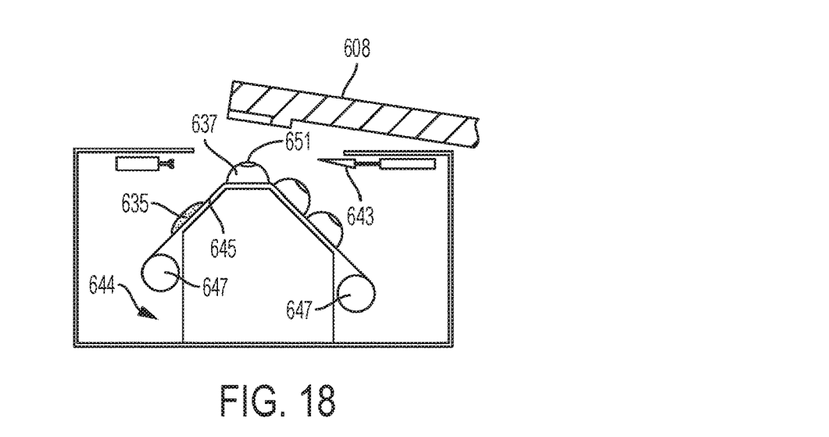

Referring to FIG. 18, the blade 643 is retracted. The applicator 644 is activated, for example, as discussed in operation 540 of process 500 and FIG. 15. The extension 608 opens to facilitate movement of items supported by the belt 645. The belt 645 is advanced by the drives 647 to move the old cover material 635 away and move new cover material 637 into a position where adhesive 651 on the new cover material 637 is aligned to engage the extension 608.

Figure 19:
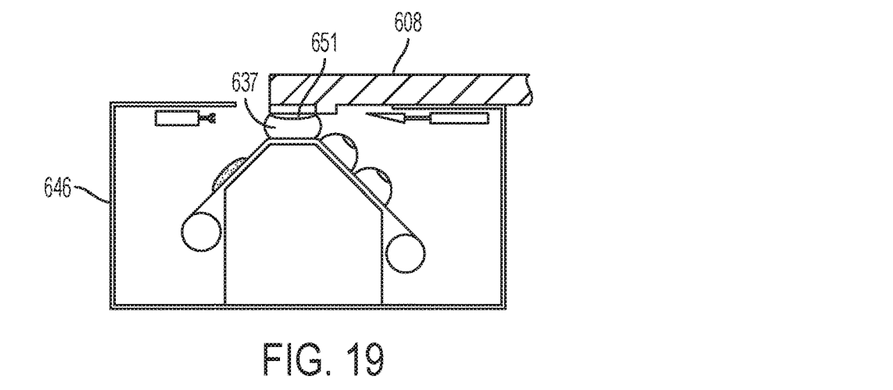

Referring to FIG. 19, the extension 608 is brought into engagement with the structure 646 again, causing the extension 608 to engage the adhesive 651 on the new cover material 637. The adhesive 651 is allowed to set or cure.

Figure 20:
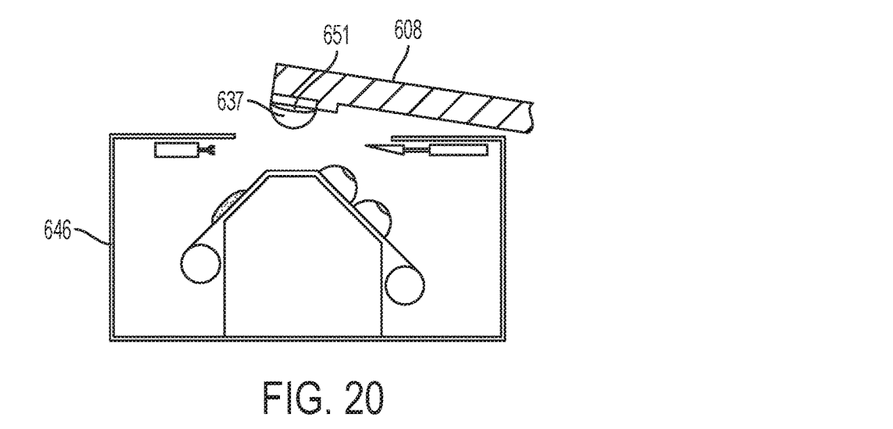

Referring to FIG. 20, the new cover material 637 is bonded to the extension 608 by the cured adhesive 651 and moved away from the structure 646 as the extension 608 is disengaged from the structure 646 to move away for other grasping operations.

Figure 21:
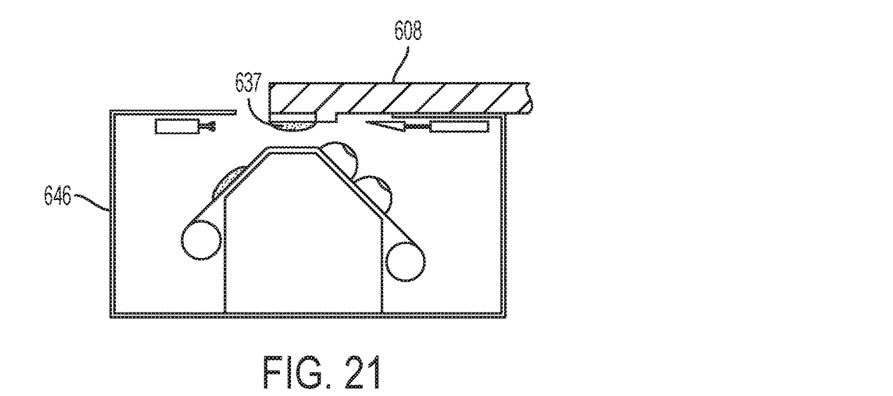

Referring to FIG. 21, after various other grasping operations, the extension 608 may be returned to engagement with the structure 646. The new cover material 637 on the extension 608 in FIG. 20 has now become old cover material 637 through use and is ready for detection by the probe 639 to determine if the now old cover material 637 warrants replacement.

Other variations of the cover replacement system 600 are also possible. For example, although the sensor 640, the remover 642, and the applicator 644 are all shown together in FIGS. 16-21, in some embodiments, any of the sensor 640, the remover 642, and/or the applicator 644 may be separate systems from one or more of the others. In some embodiments, one or more of the sensor 640, the remover 642, and/or the applicator 644 may be utilized in the absence of one or more of the others. In some embodiments, any of the sensor 640, the remover 642, and/or the applicator 644 may be integrated in part or in whole into some portion or multiple portions of the manipulator 102, such as into a hub 106, an arm 104, an individual extension 108, an extension 108 other than the extension 108 bearing the replaceable cover material 136, or other components or combinations thereof.

Based at least in part on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   a robotic manipulator comprising:
      a hub;
      a plurality of extensions each having a rigid member movable relative to the hub; and
      a cover layer applied to at least one rigid member of the plurality of extensions;
   a tester;
   a remover;
   an applicator; and
   a non-transitory computer-readable storage medium having stored therein instructions that, when executed by one or more processors of a computer system, cause the computer system to at least:
      receive cover quality information from the tester, the cover quality information comprising information about a quality of a material of the cover layer, wherein the quality of the material of the-cover is indicative of a deterioration of the material of the cover layer relative to a reference amount;
      provide instructions, based at least in part on the cover quality information, that cause the remover to remove the cover layer; and
      provide instructions that cause the applicator to apply a replacement for the cover layer.

2. The system of claim 1, wherein the cover layer comprises a material that is at least one of more flexible or less slippery than a material from which the rigid members are formed.

3. The system of claim 1, wherein the cover layer comprises at least one of silicone or rubber.

4. The system of claim 1, wherein at least one of the tester, the remover, or the applicator is included in an item configured to be grasped by the plurality of-extensions of the robotic manipulator.

5. The system of claim 1, wherein:
   the tester comprises a means for obtaining the cover quality information;
   the remover comprises a means for removing the cover layer; and
   the applicator comprises a means for applying the replacement for the cover layer.

6. A non-transitory computer-readable storage medium having stored therein instructions that, when executed by one or more processors of a computer system, cause the computer system to at least:
   receive, from a sensor configured to monitor a flexible cover layer located on a rigid member of an extension of a robotic manipulator, an indication that replacement is warranted for the flexible cover layer based on an indication of deterioration of a material of the flexible cover layer relative to a reference amount; and provide instructions, based at least in part on the indication, that cause a remover to remove the flexible cover layer from the rigid member; and provide instructions, in response to removal of the flexible cover layer, that cause an applicator to apply a replacement flexible cover layer to the rigid member.

7. The non-transitory computer-readable storage medium of claim 6, wherein the indication that replacement is warranted for the flexible cover layer comprises an indication that a conductivity of the flexible cover layer has changed beyond a threshold amount.

8. The non-transitory computer-readable storage medium of claim 6, wherein the indication that replacement is warranted for the flexible cover layer comprises an indication that an optically-detectable characteristic of the flexible cover layer has changed beyond a threshold amount.

9. The non-transitory computer-readable storage medium of claim 6, wherein the instructions that cause removal of the cover layer comprise instructions that cause the remover to activate a heating element to heat at least one of the flexible cover layer or an adhesive layer coupling the flexible cover layer to the rigid member so as to facilitate removal of the flexible cover layer from the rigid member.

10. The non-transitory computer-readable storage medium of claim 6, wherein the instructions that cause removal of the flexible cover layer comprise instructions that cause the remover to activate a mechanical element to mechanically engage at least one of the flexible cover layer or an adhesive layer coupling the flexible cover layer to the rigid member so as to facilitate removal of the flexible cover layer from the rigid member.

11. The non-transitory computer-readable storage medium of claim 6, wherein:

the sensor comprises a means for obtaining information about the material of the flexible cover layer;

the remover comprises a means for removing the flexible cover layer; and the applicator comprises a means for applying the replacement flexible cover layer.

12. A system, comprising:

a rigid member of an extension of a robotic manipulator;

a replaceable cover located on the rigid member; and a sensor configured to obtain information about a quality of a material of the replaceable cover to facilitate communication that replacement of the replaceable cover is warranted due to deterioration of the material of the flexible cover layer relative to a reference amount.

13. The system of claim 12, wherein the sensor comprises a conductivity sensor and the information comprises information about a conductivity of the replaceable cover.

14. The system of claim 12, wherein the sensor comprises an optical sensor and the information comprises information about an optically-detectable characteristic of the replaceable cover.

15. The system of claim 12, further comprising a remover configured to, in response to a determination that replacement of the replaceable cover is warranted, at least one of heat, mechanically engage, or chemically degrade at least one of the replaceable cover or an adhesive layer coupling the replaceable cover layer to the rigid member so as to facilitate removal of the replaceable cover layer from the rigid member.

16. The system of claim 15, further comprising an applicator configured to, in response to removal of the replaceable cover, apply a new layer of cover to the rigid member.

17. The system of claim 16, wherein the applicator is configured to apply the new layer of cover to the rigid member of the extension of the robotic manipulator by at least one of:

application of pressure of the rigid member of the extension of the robotic manipulator against the new layer of cover or against a layer of adhesive on the new layer of cover;

dipping the rigid member of the extension of the robotic manipulator into a material that will form or adhere the new layer of cover upon curing;

painting the new layer of cover or an associated adhesive onto the rigid member of the extension of the robotic manipulator; or spraying the new layer of cover or an associated adhesive onto the rigid member of the extension of the robotic manipulator.

18. The system of claim 17, wherein at least one of the sensor, the remover, or the applicator are positioned on at least one of a graspable item, a hub to which the rigid member of the extension is movably attached, or a mechanism separate from the robotic manipulator.

19. The system of claim 12, wherein the sensor comprises a means for obtaining information about the quality of the material of the replaceable cover.

20. The system of claim 15, wherein the remover comprises a means for facilitating removal of the replaceable cover layer.

21. The system of claim 16, wherein the applicator comprises a means for applying the new layer of cover.

* * * * *